US010299105B2

(12) United States Patent
Shmidt

(10) Patent No.: US 10,299,105 B2
(45) Date of Patent: *May 21, 2019

(54) METHODS AND SYSTEMS FOR VARYING CHANNEL SCANNING DURATION

(71) Applicant: Google LLC, Mountain View, CA (US)

(72) Inventor: Dmitry Shmidt, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,781

(22) Filed: Oct. 28, 2017

(65) Prior Publication Data
US 2018/0049017 A1 Feb. 15, 2018

Related U.S. Application Data

(63) Continuation of application No. 15/222,637, filed on Jul. 28, 2016, now Pat. No. 9,832,632, which is a continuation of application No. 14/588,903, filed on Jan. 3, 2015, now Pat. No. 9,432,834.

(51) Int. Cl.
H04B 1/16 (2006.01)
H04W 8/00 (2009.01)
H04W 48/16 (2009.01)
H04W 4/80 (2018.01)
H04W 84/12 (2009.01)
H04W 88/02 (2009.01)

(52) U.S. Cl.
CPC .............. *H04W 8/005* (2013.01); *H04B 1/16* (2013.01); *H04W 4/80* (2018.02); *H04W 48/16* (2013.01); *H04W 84/12* (2013.01); *H04W 88/02* (2013.01)

(58) Field of Classification Search
CPC ....... H04W 48/16; H04W 4/80; H04W 84/12; H04W 88/02; H04W 8/005; H04W 60/00
See application file for complete search history.

(56) References Cited

U.S. PATENT DOCUMENTS

| 8,391,897 | B1 | 3/2013 | Oroskar et al. |
| 8,447,252 | B2 | 5/2013 | Bagge et al. |
| 8,553,617 | B1 | 10/2013 | Shmidt |
| 9,432,834 | B2 * | 8/2016 | Shmidt ................. H04W 8/005 |
| 2004/0264413 | A1 | 12/2004 | Kaidar et al. |
| 2006/0045018 | A1 | 3/2006 | Masri |
| 2007/0207841 | A1 | 9/2007 | Amerga et al. |
| 2007/0263558 | A1 | 11/2007 | Salomone |
| 2009/0075653 | A1 | 3/2009 | Yeom |
| 2009/0289601 | A1 | 11/2009 | Kanade et al. |
| 2009/0298437 | A1 | 12/2009 | Hoefel et al. |
| 2010/0309815 | A1 | 12/2010 | Yepez et al. |
| 2011/0261766 | A1 | 10/2011 | Tang |

(Continued)

*Primary Examiner* — Kwasi Karikari
(74) *Attorney, Agent, or Firm* — McDonnell Boehnen Hulbert & Berghoff LLP

(57) ABSTRACT

A device that includes one or more processors may receive instructions to scan, at a given time, one or more channels in one or more frequency bands for presence of wireless devices in an environment of the device. The device may also identify one or more operations of the device that are occurring at the given time. The device may also adjust a duration of scanning the one or more channels based on the identified operations. The device may also cause a wireless receiver of the device to scan, for the adjusted duration, the one or more channels for the presence of the wireless devices.

17 Claims, 5 Drawing Sheets

(56) References Cited

U.S. PATENT DOCUMENTS

| | | |
|---|---|---|
| 2013/0308512 A1 | 11/2013 | Jeong |
| 2014/0073302 A1 | 3/2014 | Trethewey et al. |
| 2014/0079043 A1* | 3/2014 | Montemurro ..... H04W 52/0216 370/338 |
| 2014/0185605 A1 | 7/2014 | Oh et al. |
| 2014/0194086 A1 | 7/2014 | Alam et al. |

* cited by examiner

METHODS AND SYSTEMS FOR VARYING CHANNEL SCANNING DURATION

CROSS-REFERENCE TO RELATED APPLICATIONS

This application is a continuation of U.S. application Ser. No. 15/222,637, filed Jul. 28, 2016, which is a continuation of U.S. application Ser. No. 14/588,903, filed Jan. 3, 2015, the contents of each which are entirely incorporated herein by reference as if fully set forth in this application.

BACKGROUND

Unless otherwise indicated herein, the materials described in this section are not prior art to the claims in this application and are not admitted to be prior art by inclusion in this section.

Wireless communication systems typically transmit and receive information over multiple frequency channels. A wireless transceiver of a device may be tuned to a particular frequency to allow the device to communicate over a particular channel with a particular wireless device in the system. In another instance, the transceiver may be tuned to another frequency to allow the device to communicate over another channel with another wireless device in the system. In a typical system, the device may thus establish a connection with one or more wireless devices to receive access to a network or to communicate information with the system.

SUMMARY

In one example, a method is provided that comprises a device receiving instructions to scan, at a given time, one or more channels in one or more frequency bands for presence of wireless devices in an environment of the device. The device may include one or more processors. The method also comprises identifying one or more operations of the device that are occurring at the given time. The method also comprises adjusting a duration of scanning the one or more channels for the presence of the wireless devices based on the identified operations of the device. The method also comprises causing a wireless receiver of the device to scan, for the adjusted duration, the one or more channels for the presence of the wireless devices.

In another example, a device is provided that comprises a wireless receiver. The device also comprises one or more processors and data storage storing instructions, that upon execution by the one or more processors, cause the device to identify one or more operations of the device that are occurring at a given time. The instructions may further cause the device to adjust a duration of scanning one or more channels in one or more frequency bands for presence of wireless devices in the environment of the device based on the identified operations of the device. The instructions may further cause the device to operate the wireless receiver to scan, at the given time and for the adjusted duration, the one or more channels for the presence of the wireless devices.

In yet another example, a computer readable medium is provided. The computer readable medium may have instructions stored therein that when executed by a computing device cause the computing device to perform functions. The functions comprise receiving a request to scan, at a given time, one or more channels in one or more frequency bands for presence of wireless devices in an environment of the computing device. The functions further comprise identifying one or more operations of the computing device that are occurring at the given time. The functions further comprise adjusting a duration of scanning the one or more channels for the presence of the wireless devices. The functions further comprise causing a wireless receiver of the computing device to scan, for the adjusted duration, the one or more channels for the presence of the wireless devices.

In still another example, a system is provided comprising a means for a device receiving instructions to scan, at a given time, one or more channels in one or more frequency bands for presence of wireless devices in an environment of the device. The device may include one or more processors. The system also comprises means for identifying one or more operations of the device that are occurring at the given time. The system also comprises means for adjusting a duration of scanning the one or more channels for the presence of the wireless devices based on the identified operations of the device. The system also comprises means for causing a wireless receiver of the device to scan, for the adjusted duration, the one or more channels for the presence of the wireless devices.

These as well as other aspects, advantages, and alternatives, will become apparent to those of ordinary skill in the art by reading the following detailed description, with reference where appropriate to the accompanying figures.

DETAILED DESCRIPTION

Figure 1A:
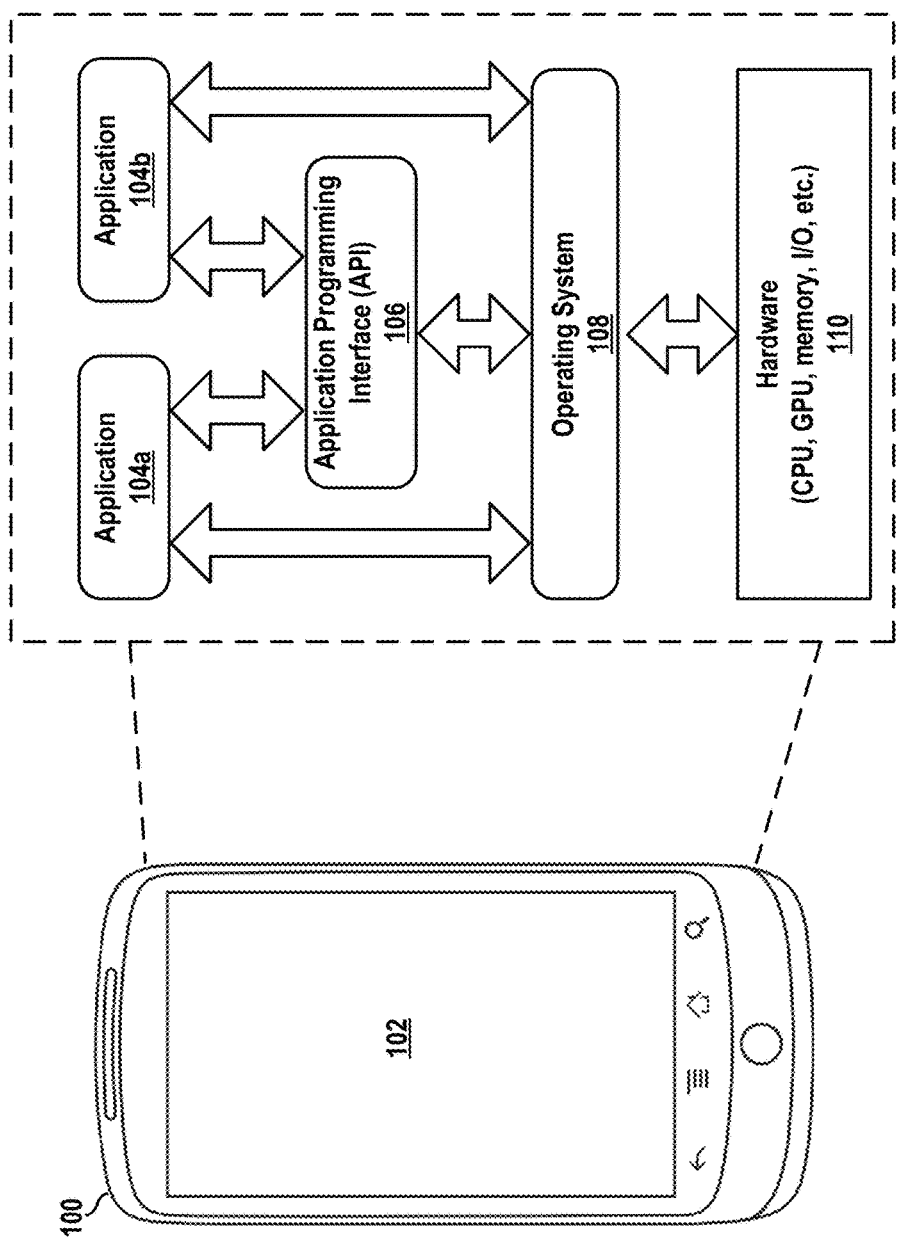
FIG. 1A illustrates a device, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

In some example wireless communications systems disclosed herein, an available frequency band is utilized by network nodes (e.g., IEEE 802.11-compliant access points such as those in a wireless local area network (WLAN), Bluetooth beacons, wireless wide area network (WWAN) access points, cellular towers, nodes, base stations, etc.) to wirelessly communicate with client devices (e.g., smartphones, mobile devices, desktop computers, laptops, wearable devices, etc.). In some systems, client devices may also communicate with one another. In both cases, the available frequency band may be regulated in a particular geographic zone according to a standard (e.g., IEEE 802.11, etc.) that defines one or more channels within the frequency band for the wireless communication. By way of example, a G-band of the IEEE 802.11 standard in some geographical zones provides fourteen channels (e.g., within a frequency band proximal to a frequency of 2.4 GHz), eleven of which are active channels that compliant wireless devices may utilize to establish communications with other compliant wireless devices/access points. In this example, channel 1 may have a center frequency of 2.412 GHz, channel 6 may have a center frequency of 2.437 GHz, etc. Further, in this example, each channel may have a particular bandwidth (e.g., 20 MHz, 22 MHz, etc.). As another example, an A-band in some geographical zones provides nine active channels (e.g., within a frequency band proximal to a frequency of 5 GHz). Other standards are possible as well for various frequency bands and according to various regulations of a respective geographic zone.

To facilitate discovery or association with other wireless devices in a system, a device of the present disclosure may scan the one or more frequency channels for wireless signals transmitted by any of the wireless devices. In a passive scanning mode, the device tunes a transceiver (e.g., circuitry and antenna) to a particular channel and keeps the transceiver tuned to the particular channel for a particular period of time (e.g., dwell time) to listen for wireless signals transmitted by the other wireless devices over the particular channel. In an active scanning mode, the transceiver transmits an active probe request over the particular channel, and remains tuned to the particular channel for the particular period of time to listen for a response. In some instances, the device then repeats this process for the other channels.

The dwell time per channel may vary according to a configuration of the device. On one hand, a short dwell time decreases the likelihood of detecting an active probe beacon from another wireless device in the system, a probe response from the other wireless device, or any other wireless transmission from the other wireless device. For instance, the short dwell time may be insufficient to account for delays due to various network issues such as packet congestion, packet quality, environmental effects, etc. On the other hand, a long dwell time increases the likelihood of detection but affects other operations of the device, such as operations that utilize the transceiver. Further, the long dwell time may also increase the power consumption of the device while the transceiver is powered to listen for the wireless signals in each or any of the multiple channels.

By way of example, suppose that the scanning process described above involves the device scanning 20 channels for a dwell time of 80 ms per channel. Other dwell times (e.g., 5 ms, 20 ms, 40 ms, etc.) and/or number of channels are possible and may vary according to the system or device. However, for the sake of the example, suppose that the dwell time is 80 ms per channel. The total duration for scanning all the channels in this example would then be 20*80 ms=1.6 seconds. In some instances, the scanning process may be initiated periodically, intermittently, in response to receiving a scan request, in response to a sensor measurement (e.g., location sensor, etc.), or in any other fashion according to an application or configuration of the device.

Continuing with the example above, suppose that the device performs the scanning process every minute. In one instance, the device may be utilizing the transceiver to communicate data (e.g., video stream) with a given wireless device using one of the 20 channels at the time when the scanning process should be initiated. In this instance, the device would interrupt, every minute and for 1.6 seconds, the communication with the given wireless device to perform the scanning process. In turn, the throughput or quality of the communication may be reduced. In another instance, the device (or the transceiver) may be in a low power mode (e.g., sleep mode, etc.) such as a mode when a display of the device is switched off, a user-selected power consumption mode, etc. In this instance, the device would awaken (e.g., provide power) the transceiver for 1.6 seconds to perform the scanning process every minute. In turn, power consumption of the device over a given period of time (e.g., multiple scans) would increase due to the scanning process. Suppose that, in this instance, the device is battery-powered. To that extent, the amount of increase in power consumption due to the scanning process may affect the battery life or the amount of time the device may operate using the battery.

Within examples, the present method allows mitigating the effect of the duration of the scanning process by varying a scan time for one or more channels according to operations of the device at a given time of the scanning process. In one example, where the device is engaged in an operation where detection of other wireless devices is likely useful, such as when a current connection to a network experiences reduced quality for instance, the device may increase the duration of scanning the one or more channels (e.g., restore the duration to a default duration, etc.). In another example, where the operation is one where detection of other wireless devices is less likely to be useful, such as when a display is switched off or when the device is in an idle mode for instance, the device may decrease the duration of scanning the one or more channels. Other examples are possible as well and are contemplated within exemplary embodiments herein.

Example systems herein may be implemented in or may take the form of a computing device (e.g., desktop computer, laptop, cellular phone, personal digital assistant (PDA), network node, access point, wearable device, mobile device, etc.) that includes and/or is coupled to a wireless receiver/transmitter. In an example implementation, an application, an application programming interface (API), an operating system, or circuitry that is wired to perform logic functions may provide instructions executable by one or more processors of the computing device to perform the functions described herein. Other implementations are possible as well and are described within exemplary embodiments herein.

Referring now to the figures, FIG. 1A illustrates a device 100, according to an example embodiment. The device 100 may include a display 102, applications 104a and 104b, an application programming interface (API) 106, and an operating system 108 for executing instructions to operate hardware 110 of the device 100. Although device 100 is illustrated in FIG. 1A as a smartphone, aspects of this disclosure are applicable to other computing devices such as personal computers, laptops, tablet computers, servers, wearable devices, etc.

The display 102 may include a light emitting diode (LED) display, a liquid crystal display (LCD), a cathode ray tube (CRT) display, an e-ink screen, and/or any other suitable device for presenting a graphical user interface and/or visual information to the user of the device 100. Although illustrated in FIG. 1A that the display 102 is included in the device 100, in some examples, the display 102 may be implemented as an external display coupled to the device 100. For example, the display 102 may be an external monitor or projection screen configured to display the visual information provided by the device 100.

Each of the applications 104a and 104b may include instructions that when executed cause the device 100 to perform specific tasks or functions. The applications 104a and 104b may be native applications (i.e., installed by a manufacturer of the device 100 and/or a manufacturer of the operating system 108) or may be a third-party application installed by a user of the device 100. A non-exhaustive list of example applications includes: a media player application that accepts media files as inputs and generates corresponding video and/or audio to output device(s) (e.g., the display 102, speakers, headphones, etc.); an e-reader application which accepts electronic documents (e.g., books, magazines, etc.) as an input and presents the content of the documents via the display 102; a feed reader that accepts feeds delivered over a network (e.g., RSS feeds and/or feeds from social network sites) as inputs and presents the feeds via the display 102; a map application that displays a map via the display 102; a note-taking application, a bookmarking application, a word processing application, spreadsheet application, and/or presentation application that accepts specifically formatted files as inputs and presents them via the display 102 for viewing and/or editing. Other example applications are possible.

The device 100 may also include one or more APIs, such as the API 106. The API 106 may function as an interface between the operating system 108 and the applications 104a and 104b. For example, the API 106 may provide the interface for receiving requests having a particular format from the application 104a and/or 104b, and may manage provision of the requests to the operating system 108. Further, in some examples, the API 106 may be configured to process requests that are directed to particular functions of the device 100, such as operation of the display 102 or the hardware 110. In other examples, the API 106 may be configured to process requests for any combination of functions of the device 100. Additionally or alternatively, the functions of the API 106 may be performed by the operating system 108. For example, the applications 104a and/or 104b may be configured to interface directly with the operating system 108.

The operating system 108 may interact with and manage the display 102 and the hardware 110 to provide services for the applications 104a and 104b. For example, the application 104a may request the operating system 108 to utilize the hardware 110 to scan for wireless devices in an environment of the device 100.

The hardware 110 may include, for example, a central processing unit (CPU), a graphics processor (GPU), memory, a communication interface, a power unit, an input/output (I/O) interface, user input device(s), and output device(s). Components of hardware 110 may be controlled by instructions contained in applications 104a and 104b, the API 106, and/or the operating system 108.

The central processing unit (CPU) may be operable to effectuate the operation of the device 100 by executing instructions stored in memory or disk storage. Such instructions may include the operating system 108 and the applications 104a and 104b, for example. The CPU may, for example, comprise a single or multi-core processor, an application specific integrated circuit (ASIC), field programmable gate array (FPGA), and/or any other suitable circuitry.

The graphics processor may be operable to generate a video stream for output to the display 102 based on instructions and/or data received from the CPU. Additionally or alternatively, the graphics processor may be operable to perform animations of virtual objects on a display region of the display 102. Thus, data structures corresponding to images to be displayed on the display 102 may be stored to and read from the memory or disk storage by the CPU. The CPU may convey such data structures to the graphics processor via a standardized application programming interface (API) such as, for example, the API 106, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 108 and the applications 104a and 104b. Runtime memory may store data generated or used during execution of the operating system 108 or applications 104a and 104b.

The communication interface may be operable to allow wired (e.g., Ethernet, Universal Serial Bus (USB), etc.) and/or wireless (e.g., Wi-Fi, Bluetooth, near-field, Infrared (IR), etc.) connectivity between the device 100 and one or more external devices. To that end, the communication interface may include a wireless receiver configured to receive and/or manipulate wireless signals, and/or a wireless transmitter configured to transmit and/or manipulate wireless signals. In some examples, the wireless receiver and the wireless transmitter can be implemented as a single circuit that performs both transmit and receive functions. The communication interface may also include one or more antennas (e.g., dipole, etc.) coupled to the various transmitter, receiver, and/or transceiver circuitry to broadcast and/or receive the wireless signals.

The input/output (I/O) interface may be operable to receive signals from the input device(s), and provide corresponding signals to the CPU and/or the graphics processor. The input device(s) may include, for example, a mouse, a touchpad, a motion sensor, a trackball, a voice recognition device, a keyboard, or any other suitable input device which enables a user to interact with the device 100. The output devices may include, for example, the display 102, additional displays, headphones, and/or speakers.

In some examples, the device 100 may include more or less components than those shown in FIG. 1A. In one example, the device 100 may not include any or some of the applications 104a, 104b, and the API 106. In another example, the hardware 110 may not include a GPU. Other examples are possible as well.

Figure 1B:
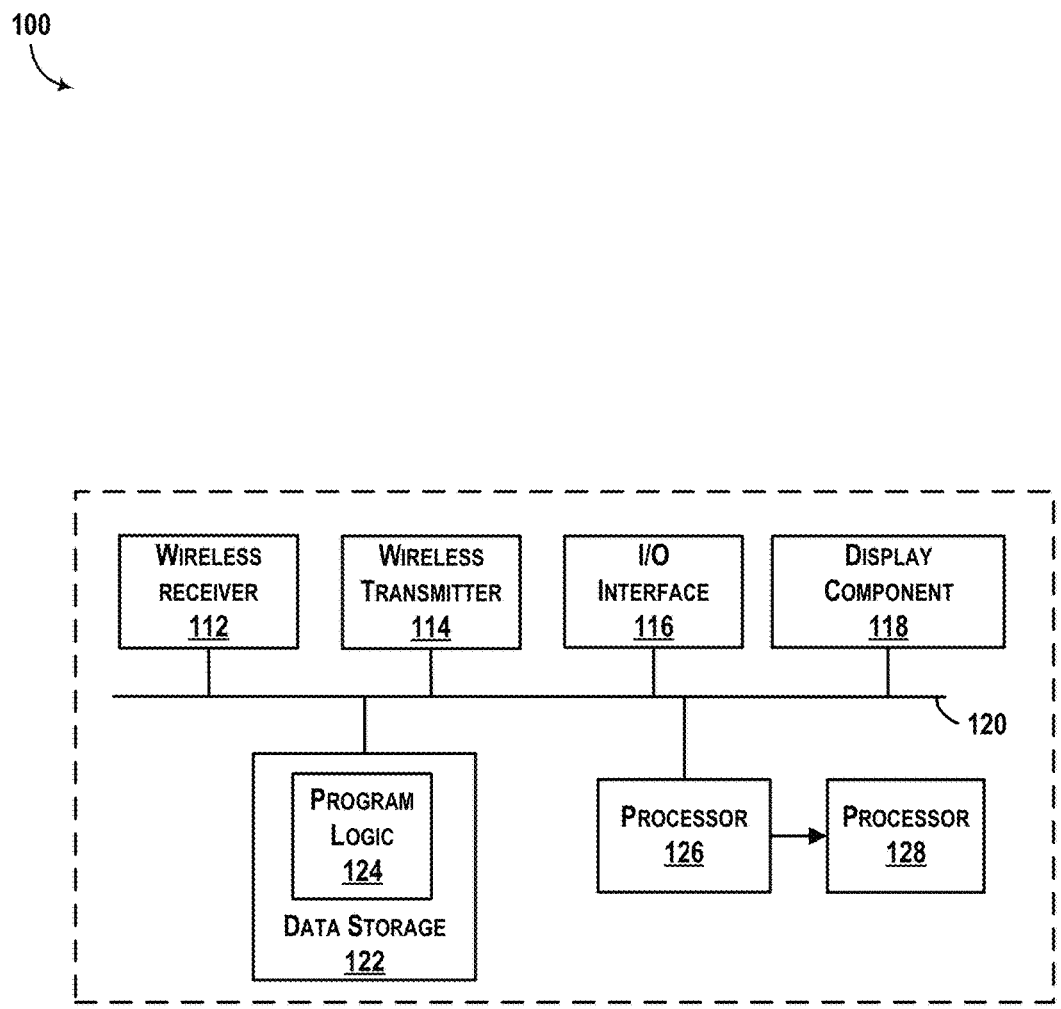
FIG. 1B is a block diagram illustrating components of the device in FIG. 1A.

FIG. 1B is a block diagram illustrating components of the device 100 in FIG. 1A. In some examples, some components illustrated in FIG. 1B may be distributed across multiple computing devices. However, for the sake of example, the components are shown and described as part of one example device 100.

In some implementations, the device 100 may include a device platform (not shown), which may be configured as a multi-layered platform. The device platform may include different applications and an application framework, as well as various kernels, libraries, and runtime entities. In other examples, other formats or systems may operate the device 100 as well.

As shown, the device 100 includes a wireless receiver 112, a wireless transmitter 114, an I/O interface 116, a display component 118, data storage 122, and a processor 126. Components illustrated in FIG. 1B may be linked together by a communication link 120. In some examples, the device 100 may include hardware to enable communication within the device 100 and between the device 100 and another computing device (not shown), such as a server entity. The hardware may include antennas, for example.

The wireless receiver 112 and the wireless transmitter 114 may be configured to allow the device 100 to wirelessly communicate (e.g., Wi-Fi, Bluetooth, IR, near-field, short-range wireless radio technology, communication protocols described in IEEE 802.11 (including any IEEE 802.11 revisions), cellular technology, etc.) with another computing device (not shown), such as a server, an access point, another device similar to the device 100, etc. In particular, the wireless receiver 112 may be configured to wirelessly receive data from one or more computing devices, and the wireless transmitter 114 may be configured to send data to the one or more computing devices. In some examples, the receiver 112 and the transmitter 114 may also maintain and manage records of data received and sent by the device 100. In other examples, records of data may be maintained and managed by other components of the device 100.

In some examples, the device 100 may also include wired transmitters and/or receivers (not shown) to allow wired communication as well using any wired communication technology (e.g., USB, HDMI, Ethernet, serial line, etc.).

The I/O interface 116 may include a user-interface, such as a keyboard, microphone, touch screen, etc., to receive inputs, and circuitry to manage and maintain the user-interface. Further, in some examples, the interface 116 may also include interface with output devices such as the display 102 of FIG. 1A.

The display component 118 may be a hardware interface that is configured to facilitate output of visual information via the display 102 of FIG. 1A. For example, the display component 118 may include circuitry that operates the display 102, or may communicate the visual information to the display 102 by using the wireless transmitter 118 to couple the display 102 with the device 100.

The processor 126 may be configured to operate the device 100. For example, the processor 126 may be configured to cause the wireless receiver 112 to perform a scan over one or more channels in one or more frequency bands for presence of wireless devices in the environment of the device 100. The processor 126 may also be configured to operate other components of the device 100 such as input/output components or display components. The device 100 is illustrated to include an additional processor 128. The processor 128 may be configured to control some of the aspects described for the processor 126. For example, the processor 128 may be a GPU that operates the display 102, and the processor 128 may be configured to control other aspects such as the wireless receiver 112 and/or the wireless transmitter 114. Some embodiments may include only one processor (e.g., processor 126) or may include additional processors configured to control various aspects of the device 100.

The data storage 122 may store program logic 124 that can be accessed and executed by the processor 126 and/or the processor 128. For example, the program logic 124 may include the instructions provided by the applications 104a and 104b, the API 106, and/or the operating system 108.

The communication link 120 is illustrated as a wired connection; however, wireless connections may also be used. For example, the communication link 120 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

Figure 2:
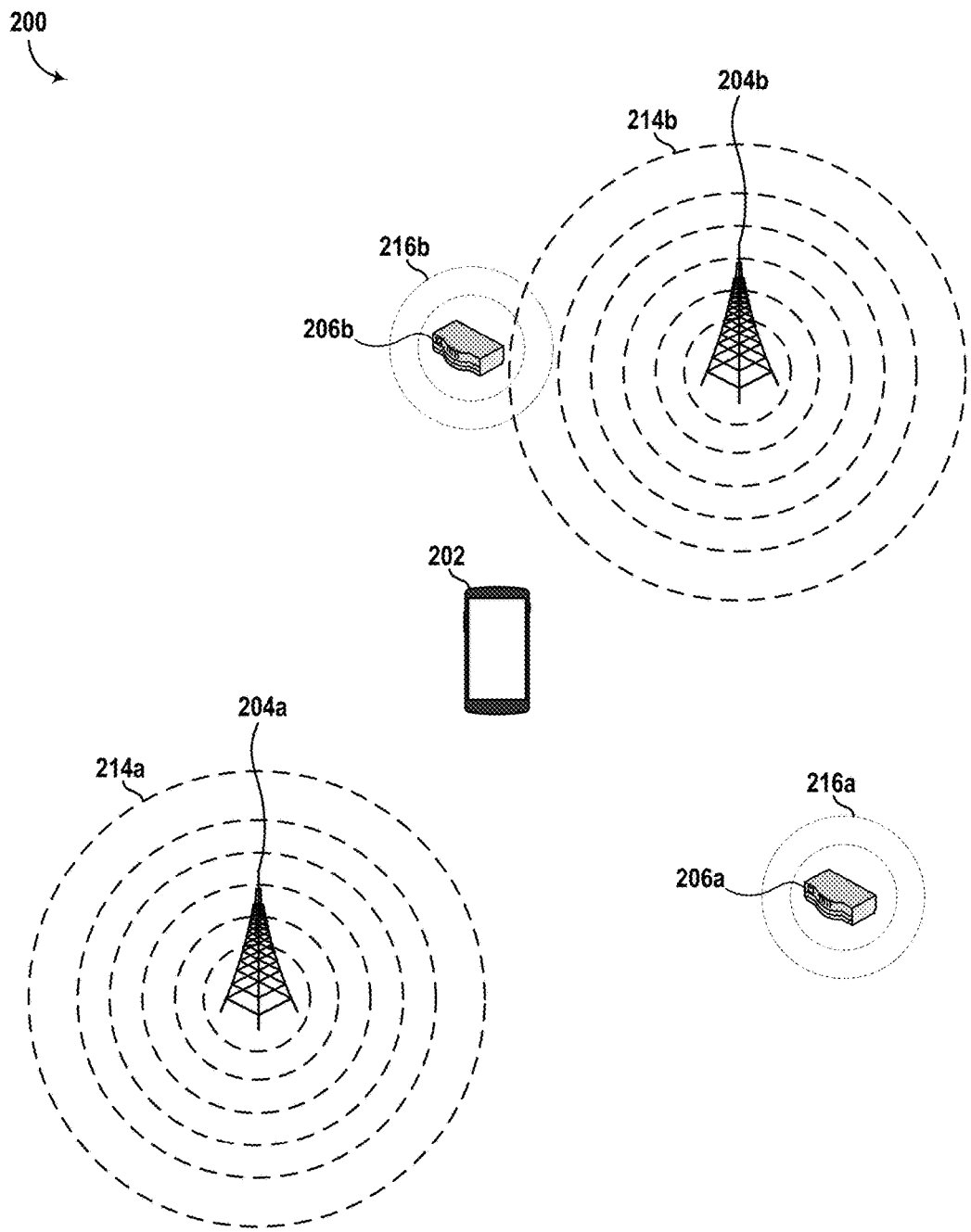
FIG. 2 illustrates a system, according to an example embodiment.

FIG. 2 illustrates a system 200, according to an example embodiment. As shown, the system 200 includes a client device 202 in an environment that includes wireless devices 204a, 204b, 206a, 206b. As shown, wireless devices 204a and 204b are wireless wide area network (WWAN) access points, and wireless devices 206a and 206b are wireless local area network (WLAN) access points. However, in some embodiments, the system 200 may include other types of access points and/or only one type of access point. For example, the system 200 may alternatively include Bluetooth access points, near-field access points, or any other wireless device. Further, in some embodiments, the system 200 may include a different number of wireless devices and/or client devices than those shown. For example, the system 200 may alternatively include multiple client devices and/or a single access point. The device 202 may be similar to the device 100 of FIGS. 1A-1B.

The device 202 and/or the wireless devices 204a, 204b, 206a, 206b may be configured to wirelessly communicate information with one another. In one scenario, the client device 202 may receive connectivity to a server (not shown) or a network via one or more of the access points 204a, 204b, 206a, 206b. In another scenario, the client device 202 may wirelessly communicate information with another client device (not shown). Other scenarios are possible as well.

In some examples, the wireless devices 204a, 204b, 206a, 206b may transmit wireless signals that are shown in FIG. 2 as, respectively, signals 214a, 214b, 216a, 216b. The wireless signals may include, for example, an active probe beacon, a probe response, or any other wireless signal that may be received by the device 202 to indicate presence of a corresponding wireless device of the wireless devices 204a, 204b, 206a, 206b.

However, location and wireless communication availability of the device 202 and/or the wireless devices 204a, 204b, 206a, 206b may vary over time. In one example, the device 202 may be a mobile device that travels such that at a given time, one or more of the signals 214a, 214b, 216a, 216b is within the environment (e.g., threshold distance for wireless communication, etc.) of the device 202. In another example, the access points 206a, 206b may also be moved (e.g., wireless routers in a building) or may be powered during certain times of the day among other possibilities. Accordingly, in some examples, the present method allows the device 202 and/or the wireless devices 204a, 204b, 206a, 206b to scan a respective environment for presence of other client devices/wireless devices at a given time. In some examples, the scanning process may occur intermittently, periodically, in response to receiving a scan request, or in response to any other event according to a configuration of the respective device.

The scanning process may involve, for example, the device 202 tuning, at or after the given time for the scan, a wireless receiver thereof (not shown) to a particular channel of a frequency band (e.g., channel 1 of the G-band of the IEEE 802.11 standard, etc.). The device 202 may then remain tuned to the particular channel, for a given period of time (e.g., dwell time), to listen for wireless transmissions from other devices (e.g., any of the wireless devices 204a, 204b, 206a, 206b, etc.). Further, the scanning process may then involve the device 202 tuning the wireless receiver to another channel of the frequency band (or another frequency band), and remaining tuned to the other channel for the given period of time (e.g., dwell time) or some other period of time. Through this process, for example, a duration of the scanning process may include a sum of the dwell times for listening to all the channels (and possibly additional time for re-tuning, powering, etc. of the wireless receiver).

Figure 3:
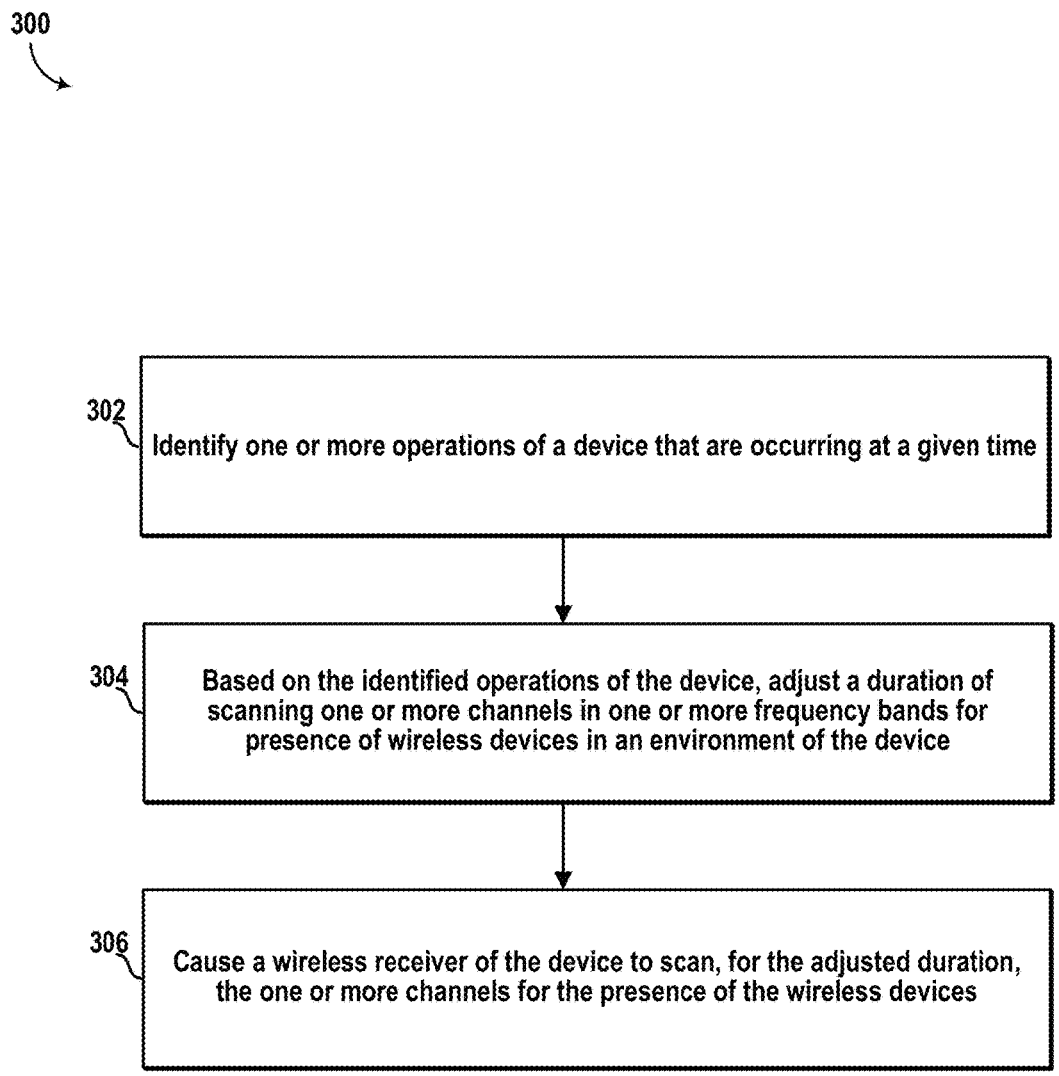
FIG. 3 is a block diagram of a method, according to an example embodiment.

FIG. 3 is a block diagram of a method 300, according to an example embodiment. Method 300 shown in FIG. 3 presents an embodiment of a method that could be used with any of the devices 100, 202, 204a, 204b, 206a, 206b, for example. Method 300 may include one or more operations, functions, or actions as illustrated by one or more of blocks 302-306. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes identifying one or more operations of a device that are occurring at a given time. The device may be similar to the device 100. For example, the device may include one or more processors similar to the processor 126 of the device 100.

Further, in some examples, the method 300 may include the device receiving instructions to scan, at a given time, one or more channels in one or more frequency bands for presence of a wireless device in an environment of the device (e.g., the device 202 of the system 200, etc.). By way of example, the device may include a wireless receiver (e.g., wireless receiver 112) that is configured to scan 11 channels in a G-band and 9 channels in an A-band of an IEEE 802.11 standard environment. In this example, the instructions may cause the device to scan, at the given time, the 20 channels for a particular dwell time (e.g., 80 ms) on each channel. The duration of such scan, for example, may include a sum of the dwell times (e.g., 20*80 ms=1.6 seconds).

In one example, the instructions may be provided by an application such as the applications 104a and 104b of the device 100. For example, an email application may request the scan (i.e., provide the instructions) to facilitate initiating a connection with an access point (e.g., the wireless device), and thereby download email from a server via the access point. In another example, the instructions may be provided periodically or intermittently. For example, an operating system such as the OS 108 may provide the instructions (e.g., periodically or intermittently) to scan for presence of access points, Bluetooth beacons, or other wireless devices in the vicinity of the device in anticipation of a user request to connect to such access point. In yet another example, the instructions may be provided in response to some other event, such as launching an application, beginning a video stream, detecting poor signal strength of a current connection, or any other event. Other examples are possible as well.

Thus, in some examples, the identification of the one or more operations at block 302 may be in response to receiving the instructions to scan.

At the given time or prior to the given time, in some examples, the device of the present method may identify various operations of the device. A non-exhaustive list of example operations includes: wireless connectivity status of the device, operation of a particular application (e.g., video display application, etc.), power mode of the device (e.g., power-saving mode, normal mode, airplane mode, etc.), power consumption level of the device or components thereof, inputs received by the device, or any other operation.

At block 304, the method 300 includes adjusting a duration of scanning one or more channels in one or more frequency bands for presence of wireless devices in an environment of the device based on the identified operations of the device.

In line with the discussion above, the duration of scanning the one or more channels may interfere with some operations of the device. For example, while the device is scanning the one or more channels, the device may consume additional power to operate wireless receiver (e.g., transceiver) circuitry during the scan. In some examples, the present method allows mitigating the effect of such interference by adjusting the duration of the scan according to the one or more operations of the device at the given time that are identified at block 302.

In a first example, the device may detect that an amount of power to a display of the device is less than a threshold. For instance, the display may be switched off or may be operating in a low-power mode (e.g., due to inactivity or other configuration setting, etc.). In this instance, detecting the presence of the wireless device in the environment may be less critical than an instance where the display is switched on (e.g., device is being actively used at the given time, etc.). In this example, the device may adjust the duration of the scan by reducing the dwell time for scanning some or all of the one or more channels based at least in part on the amount of the power to the display being less than the threshold, thereby conserving the amount of power provided to the wireless receiver. Accordingly, in some examples, the method 300 may include detecting that an amount of power to a display of the device is less than a threshold, and responsively reducing the duration of scanning the one or more channels.

In a second example, the device may determine that, at the given time, an external computing device is in wireless connectivity with the device using one of the one or more channels. For instance, the device may be connected to an access point using one of the channels at the given time. In this instance, detection of the presence of other wireless devices in the environment may be less critical, since the device already has an active connection. In turn, for example, the device may adjust the duration to reduce the scanning time. Accordingly, in some examples, the method 300 may include determining that the device is in wireless connectivity with an external computing device using one of the one or more channels, and responsively reducing the duration of scanning the one or more channels.

In a third example, the device may detect a change in power consumption of the device greater than a threshold change. For instance, the device may initiate a map application that consumes a significant amount of power (e.g., to use a Global Positioning System (GPS) sensor, etc.). In this instance, the amount of power consumed is substantially more than the power that would be saved by reducing the duration of the scan time, and thus the dwell time per channel may be restored/increased to a longer time (e.g., 80 ms). As a variation of the example above, if the map application is closed, the device may detect a significant reduction in the power consumption (e.g., greater than the threshold change), and thus may reduce the dwell time per channel (e.g., 20 ms). Accordingly, in some examples, the method 300 may include detecting a change in power consumption of the device greater than a threshold change. In these examples, adjusting the duration is based also on detecting the change.

In a fourth example, the device may receive an input from an input interface (e.g., I/O interface 116), and adjust the scanning duration accordingly. In one instance, the device may detect input from a button or touchscreen, which may indicate that a user of the device is currently (or recently) using the device, and may thereby need to detect presence of other wireless devices in the environment. In this instance, the device may increase or restore the dwell time per channel (e.g., 80 ms) to increase the likelihood of detecting other wireless devices. In another instance, the device may detect an input requesting that the device operate in a low-power mode. In this instance, the device may reduce the dwell time per channel (and therefore the duration of scanning the one or more channels) to reduce overall power consumption. Accordingly, in some examples, the method 300 may include receiving an input from an input interface of the device. In these examples, adjusting the duration may be responsive to receiving the input.

In a fifth example, the device may detect activity of a particular application in the device, and adjust the duration accordingly. For instance, the device may detect activity of a video playback application, an audio application, a phone application, or any other application where a user of the device is unlikely to request or need detection of wireless devices in the environment at the given time. In this instance, the device may reduce the dwell time per channel. In another instance, the device may detect activity of a web browser application that may indicate that the user may need to wirelessly connect to other access points (e.g., in case a current connection experiences poor quality). In this instance, the device may increase or restore the dwell time to a longer time. Accordingly, in some examples, the method 300 may include detecting activity of a particular application in the device. In these examples, adjusting the duration may be based on detecting the activity.

In a sixth example, the device may receive a request for wireless connectivity to an external computing device. For instance, a user of the device may request the device to send an email to a server. In this instance, the device may increase or restore the dwell time per channel to increase the likelihood of detecting presence of an access point to facilitate sending the email. Accordingly, in some examples, the method 300 may include receiving a request for wireless connectivity to an external computing device from an application in the device, and responsively increasing the duration of scanning the one or more channels.

In a seventh example, the device may adjust the scanning duration based on previously detected wireless devices in the environment. For instance, the device may maintain a list of detected wireless devices, or may detect the presence of a given wireless device while scanning one of the one or more channels. In this instance, the device may reduce the dwell time per channel (at least for the remaining channels to be scanned), since at least one wireless device in the environment was already detected. Accordingly, in some examples, the method 300 may include detecting presence of a given wireless device in the environment of the device based on a scan of a given channel of the one or more channels by the wireless receiver, and responsively reducing the adjusted duration of scanning the one or more channels.

In an eighth example, the device may adjust the duration based on an event-based configuration or other configuration of the device. For instance, the device may detect a preferred network offload (PNO) event. PNO may allow the device to establish and/or maintain a Wi-Fi connection even when the device is in a low-power mode (e.g., when the screen is turned off). By way of example, the PNO configuration may allow the device to communicate using Wi-Fi (e.g., the wireless receiver) instead of a cellular communication interface that consumes more power, even when the device is in the low-power mode. In this instance, the device may increase and/or restore the dwell time per channel (e.g., 80 ms) based on receipt of the PNO event to increase the likelihood of detecting wireless devices (e.g., Wi-Fi access points) in the environment even when the device is in a low-power mode (e.g., amount of power to the display is less than the threshold).

Other examples are possible as well. Thus, the method 300 allows varying the duration of scanning the one or more channels (or the dwell time for scanning some or all of the one or more channels) according to the operations of the device at the given time of the scan.

At block 306, the method 300 includes causing a wireless receiver of the device to scan, for the adjusted duration, the one or more channels for presence of the wireless devices. For example, if the dwell time per channel is reduced to 40 ms at block 304 and the one or more channels are 20 channels. The adjusted duration may correspond to 40 ms*19 channels=800 ms. In turn, the device may tune the wireless receiver to the first channel for 40 ms, the second channel for 40 ms, etc. Other dwell times are possible as well (e.g., 5 ms, 10 ms, 20 ms, 40 ms, 80 ms, etc.) according to the configuration of the device. Further, the dwell time for each channel may be different depending on the identified operations of the device, for example.

In some examples, the method 300 may include reducing an amount of power to the wireless receiver after lapse of the adjusted duration. For example, the device may configure the wireless receiver to an "awake" mode to perform the scan for the adjusted duration, thereby increasing the power provided to the wireless receiver (e.g., Wi-Fi board, etc.). In this example, the device may then configure the wireless receiver to a "sleep" mode after the scan is performed (i.e., lapse of the adjusted duration), thereby reducing the power provided to the wireless receiver.

In some examples, the method 300 may include transmitting a probe request via a wireless transmitter (e.g., transmitter 114) using the one or more channels. In these examples, the wireless receiver may scan the one or more channels for a response to the probe request over the adjusted duration responsive to transmitting the probe request. Thus, for example, the device of the method 300 may be configured in an active scanning mode to transmit the probe request over a given channel, listen for the response over the given channel for an adjusted dwell time (e.g., 40 ms), then proceed to the next channel and transmit another probe request, etc.

Figure 4:
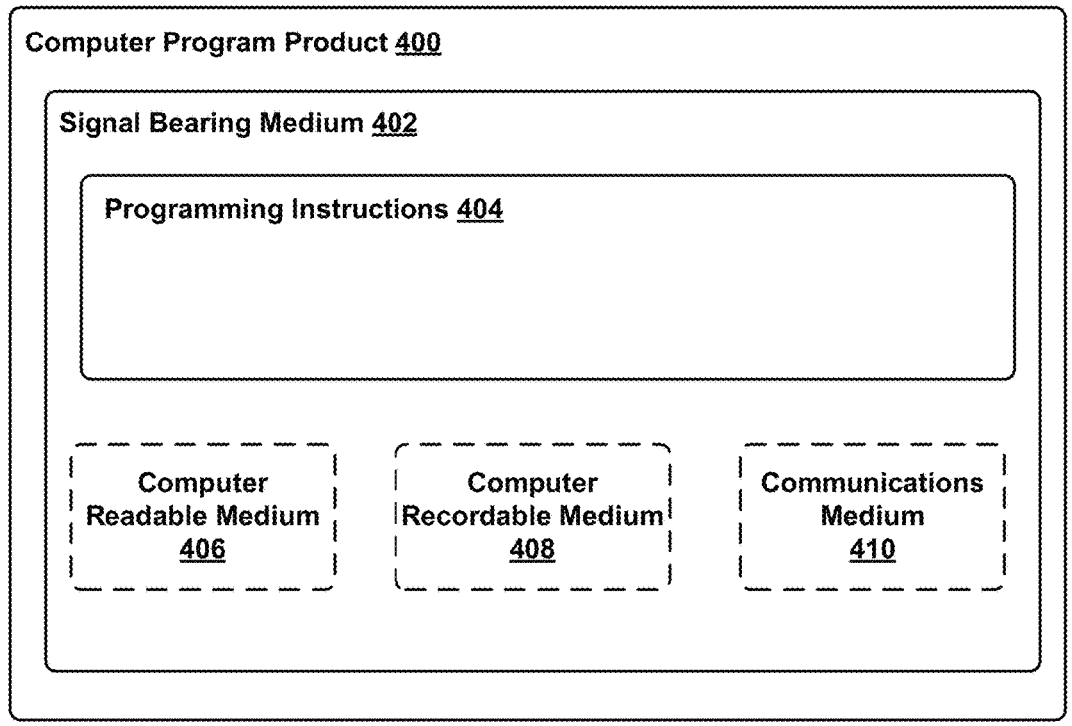
FIG. 4 depicts a computer readable medium configured according to an example embodiment.

FIG. 4 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. method 300) may be implemented by computer program instructions encoded on a computer readable storage media in a machine-readable format, or on other media or articles of manufacture (e.g., program logic 124 of the device 100). FIG. 4 is a schematic illustrating a conceptual partial view of an example computer program product that includes a computer program for executing a computer process on a computing device, arranged according to at least some embodiments disclosed herein.

In one embodiment, the example computer program product 400 is provided using a signal bearing medium 402. The signal bearing medium 402 may include one or more programming instructions 404 that, when executed by one or more processors may provide functionality or portions of the functionality described above with respect to FIGS. 1-3. In some examples, the signal bearing medium 402 may be a computer-readable medium 406, such as, but not limited to, a hard disk drive, a Compact Disc (CD), a Digital Video Disk (DVD), a digital tape, memory, etc. In some implementations, the signal bearing medium 402 may be a computer recordable medium 408, such as, but not limited to, memory, read/write (R/W) CDs, R/W DVDs, etc. In some implementations, the signal bearing medium 402 may be a communication medium 410 (e.g., a fiber optic cable, a waveguide, a wired communications link, etc.). Thus, for example, the signal bearing medium 402 may be conveyed by a wireless form of the communications medium 410.

The one or more programming instructions 404 may be, for example, computer executable and/or logic implemented instructions. In some examples, a computing device may be configured to provide various operations, functions, or actions in response to the programming instructions 404 conveyed to the computing device by one or more of the computer readable medium 406, the computer recordable medium 408, and/or the communications medium 410.

The computer readable medium 406 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
scanning, by a device that includes one or more processors, one or more channels in one or more frequency bands for presence of wireless devices in an environment of the device;
identifying one or more operations of the device associated with a given time of the scanning the one or more channels; and
based on the identified one or more operations, adjusting a scanning duration of the scanning the one or more channels,
wherein the device supports a plurality of power modes associated with a plurality of power consumption levels of the device,
wherein identifying the one or more operations comprises determining a power mode of the device, and
wherein adjusting the scanning duration comprises adjusting the scanning duration based on at least the determined power mode.

2. The method of claim 1, wherein identifying the one or more operations comprises determining a rate of power consumption of the device, and
wherein adjusting the scanning duration comprises adjusting the scanning duration based on at least the determined rate of power consumption.

3. The method of claim 1, wherein identifying the one or more operations comprises determining a rate of power consumption of the device, and wherein adjusting the scanning duration comprises:
based on at least the determined rate of power consumption being greater than a threshold, selecting a first dwell time for scanning a given channel of the one or more channels; and
based on at least the determined rate of power consumption being less than the threshold, selecting a second dwell time for scanning the given channel,
wherein the second dwell time is less than the first dwell time.

4. The method of claim 1, wherein identifying the one or more operations comprises determining a rate of power consumption of a display of the device, and
wherein adjusting the scanning duration comprises adjusting the scanning duration based on at least the determined rate of power consumption.

5. The method of claim 1, wherein scanning the one or more channels comprises causing a wireless transceiver of the device to scan the one or more channels,
wherein identifying the one or more operations comprises determining a rate of power consumption of the wireless transceiver, and
wherein adjusting the scanning duration comprises adjusting the scanning duration based on at least the determined rate of power consumption.

6. The method of claim 1, wherein identifying the one or more operations comprises determining that a particular component of the device receives less than a threshold amount of power, and
wherein adjusting the scanning duration comprises reducing the scanning duration in response to the determination that the particular component of the device receives less than the threshold amount of power.

7. The method of claim 1,
wherein adjusting the scanning duration comprises reducing the scanning duration based on at least the determined power mode being a sleep mode of the device.

8. The method of claim 1, wherein identifying the one or more operations comprises detecting presence of a given wireless device in the environment of the device during the scanning the one or more channels, and
wherein adjusting the scanning duration comprises reducing a remaining duration of the scanning the one or more channels in response to the detection of the presence of the given wireless device.

9. The method of claim 1, wherein identifying the one or more operations comprises detecting, during the scanning the one or more channels, a change in a rate of power consumption of the device that is greater than a threshold change, and
wherein adjusting the scanning duration comprises increasing a remaining duration of the scanning the one or more channels in response to the detection of the change in the rate of power consumption.

10. The method of claim 1, wherein identifying the one or more operations comprises determining that a video playback application or an audio playback application is running on the device, and
wherein adjusting the scanning duration comprises reducing the scanning duration in response to the determination that the video playback application or the audio playback application is running on the device.

11. The method of claim 1, wherein identifying the one or more operations comprises determining that a telephone application is running on the device, and
wherein adjusting the scanning duration comprises reducing the scanning duration in response to the determination that the telephone application is running on the device.

12. The method of claim 1, wherein identifying the one or more operations comprises determining that a web browser application is running on the device, and
wherein adjusting the scanning duration comprises increasing the scanning duration in response to the determination that the web browser application is running on the device.

13. The method of claim 1,
wherein identifying the one or more operations comprises receiving, from an application running on the device, during the scanning the one or more channels, a request for wirelessly transmitting content to an external computing device, and
wherein adjusting the scanning duration comprises increasing a remaining duration of the scanning the one or more channels in response to the receiving the request from the application.

14. The method of claim 1, wherein identifying the one or more operations comprises determining that the one or more channels are associated with a preferred network offload (PNO) configuration of the device, and
wherein adjusting the scanning duration comprises increasing the scanning duration in response to the determination that the one or more channels are associated with the PNO configuration of the device.

15. A device comprising:
an input interface;
one or more processors; and
data storage storing instructions that, upon execution by the one or more processors, cause the device to:
scan one or more channels in one or more frequency bands for presence of wireless devices in an environment of the device;
identify one or more operations of the device associated with a given time during the scanning the one or more channels; and
based on the identified one or more operations, adjust a scanning duration of the scanning the one or more channels,
wherein identifying the one or more operations comprises detecting receipt of an input via the input interface, and
wherein adjusting the scanning duration comprises increasing the scanning duration in response to the detection of the receipt of the input.

16. The device of claim 15, further comprising a wireless communication interface,
wherein scanning the one or more channels comprises causing the wireless communication interface to scan the one or more channels,
wherein identifying the one or more operations comprises determining a rate of power consumption of the wireless communication interface, and
wherein adjusting the scanning duration comprises adjusting the scanning duration based on at least the determined rate of power consumption.

17. A non-transitory computer readable medium having stored therein instructions that, when executed by a computing device, cause the computing device to perform functions comprising:
scanning one or more channels in one or more frequency bands for presence of wireless devices in an environment of the computing device;
identifying one or more operations of the computing device associated with a given time when the computing device is scanning the one or more channels; and
based on the identified one or more operations, adjusting a scanning duration of the scanning the one or more channels,
wherein scanning the one or more channels comprises causing a wireless receiver of the device to scan the one or more channels,
wherein identifying the one or more operations comprises determining a rate of power consumption of the wireless receiver, and
wherein adjusting the scanning duration comprises adjusting the scanning duration based on at least the determined rate of power consumption.

* * * * *